United States Patent [19] | [11] Patent Number: 4,891,942
Schwarz | [45] Date of Patent: Jan. 9, 1989

[54] HYDRAULICALLY POWERED ACTUATOR FOR MAINTAINING A MEMBER UNDER PRELOAD

[75] Inventor: Robert A. Schwarz, Rockford, Ill.

[73] Assignee: Sundstrand Corporation, Rockford, Ill.

[21] Appl. No.: 211,974

[22] Filed: Jun. 27, 1988

[51] Int. Cl.⁴ ............................................ F16D 31/02
[52] U.S. Cl. ..................................... 60/436; 60/441; 60/442; 91/447
[58] Field of Search ................ 60/435, 436, 441, 442, 60/459, 460; 91/445, 447

[56] References Cited

U.S. PATENT DOCUMENTS

| | | | |
|---|---|---|---|
| 3,601,235 | 8/1971 | Huf . | |
| 3,696,895 | 10/1972 | Schaffer . | |
| 3,717,992 | 2/1973 | Eyles | 60/460 X |
| 3,988,893 | 11/1976 | Bojas et al. . | |
| 4,317,331 | 3/1982 | Aruga et al. . | |
| 4,495,767 | 1/1985 | Aliyama et al. . | |
| 4,644,849 | 2/1987 | Tanaka . | |

FOREIGN PATENT DOCUMENTS

| | | |
|---|---|---|
| 1214386 | 2/1970 | United Kingdom . |

*Primary Examiner*—Edward K. Look
*Attorney, Agent, or Firm*—Antonelli, Terry & Wands

[57] ABSTRACT

A hydraulically powered actuator (16) for moving a member (28 or 30) into and away from a position at which the member is under a preload is disclosed. A hydraulically powered motor (22) is utilized which is coupled to the member for moving the member to and from the position at which the member is preloaded. A source (40) of pressurized hydraulic fluid is coupled to the hydraulic motor for supplying power to the motor for moving the movable member. A brake (32) is provided which is coupled to the movable member for holding the movable member in the position at which the member is preloaded. A hydraulic fluid control is provided which is coupled to the motor, the brake and the source of pressurized fluid which activates the brake after the motor has moved the member to the position at which the member is preloaded and deactivates the motor while maintaining the member under preload. The invention eliminates the build-up of heat in hydraulic fluid consequent from the prior art method of establishing preload by applying full hydraulic power to the hydraulic motor to hold the member under preload and further is not subject to leakage which is consequent from maintaining a hydraulic motor under full hydraulic pressure. Finally, the invention permits a rapid response in removing the preload from the movable member by merely applying high pressure hydraulic fluid to the hydraulic line of the motor which will cause it to rotate in the opposite direction that the motor rotated in establishing the preload.

35 Claims, 5 Drawing Sheets

HYDRAULICALLY POWERED ACTUATOR FOR MAINTAINING A MEMBER UNDER PRELOAD

TECHNICAL FIELD

The present invention relates to hydraulically powered actuators for maintaining a member under preload. More specifically, the present invention relates to hydraulically powered actuators useful for aircraft applications in which one or more control surfaces are maintained in a fixed position under a preload.

BACKGROUND ART

FIG. 1 illustrates a prior art hydraulic actuator used for aircraft. The actuator 10 is hydraulically powered. Pressurized hydraulic fluid is provided from a source (not illustrated) on a high pressure line 12 and is returned to the hydraulic source on a low pressure line 14. A conventional direct drive valve (DDV) or electrohydraulic servo valve (EHSV) 16 controls the application of pressurized hydraulic fluid on hydraulic lines 18 and 20 which permit bidirectional flow of hydraulic fluid. The DDV or DHSV 16 reverses the direction of fluid flow on hydraulic lines 18 and 20 to reverse the direction of motion of hydraulic motor 22 on output shaft 24. The shaft 24 drives a transmission 26 of any conventional design which has a pair of outputs for driving a first panel 28 and a second panel 30 each in reversible directions. As indicated at zero degrees the panels are in contact with each other under a condition of preload in which each panel is applying a force to the other panel during which the hydraulic motor 22 is maintained in a stall condition with the application of high pressure hydraulic fluid being applied thereto on one of the hydraulic lines 18 and 20.

The maintenance of the preload condition at zero degrees as illustrated on the panels 28 and 30 has disadvantages when the hydraulic motor 12 is maintained in a stall condition. This generates high hydraulic fluid leakages. As a result the stall condition creates heat in the hydraulic fluid which must be dissipated by the aircraft via a heat exchanger or other heat radiating structure. Any requirement for a heat exchanger is a penalty in weight to an aircraft. This leakage represents a power loss to the aircraft. As a result the leakage values for conventional hydraulic motors may be too high for particular applications in aircraft. The mere addition of a brake to maintain preload would introduce problems in obtaining a quick release in that control communications with the brake would introduce time delays.

DISCLOSURE OF INVENTION

The present invention provides a hydraulically powered actuator for maintaining one or more movable members under a preload without the disadvantages of the prior art discussed above. The present invention utilizes a brake which holds one or more members under a condition of preload after a hydraulic motor has placed the panels under the condition of preload. Upon activation of the brake, the pressurized fluid is removed from the hydraulic motor which minimizes the generation of heat and leakage as present in the prior art. Furthermore, the present invention permits rapid removal of the preload from the one or more members without requiring any sensors by applying high pressure to one of the input hydraulic lines of the hydraulic motor.

The actuator of the present invention sequentially applies pressurized hydraulic fluid to a hydraulically powered motor to place the one or more members under a condition of preload, applies a brake to maintain the members under the condition of preload and removes the pressurized fluid from the motor without external control other than the application of high pressure hydraulic fluid to one of the hydraulic lines of the motor. The aforementioned hydraulic control sequence is produced by a hydraulic fluid control which is disposed between a source of pressurized hydraulic fluid and the hydraulically powered motor.

The hydraulically powered actuator for moving a member into and away from a position at which the member is under a preload in accordance with the invention includes a hydraulically powered motor, coupled to the member, for moving the member to and from the position at which the member is preloaded; a source of pressurized hydraulic fluid, coupled to the hydraulic motor, for supplying power to the motor for moving the member; a brake, coupled to the movable member for holding the movable member in the position at which the member is preloaded; and a hydraulic fluid control, coupled to the motor, the brake and the source of pressurized fluid which activates the brake after the motor has moved the member to the position at which the member is preloaded and deactivates the motor while maintaining the member under preload. When the motor moves the member from the position at which the member is preloaded, the hydraulic fluid control releases the member and thereafter activates the motor. The hydraulic fluid control activates the brake by changing pressure of hydraulic fluid applied thereto and deactivates the motor by reducing the pressure of hydraulic fluid applied thereto after the brake has been activated. Preferably, the brake is released when fluid above a predetermined pressure is applied thereto which is greater than the pressure which is applied to the motor when a valve blocks the flow of pressurized hydraulic fluid to the motor to turn the motor off.

The hydraulic fluid controller includes a first pair of hydraulic lines disposed between the source of hydraulic fluid and the hydraulically powered motor; a valve disposed in the hydraulic lines, having a control line coupled to one of the hydraulic lines which varies in position between a position that hydraulic fluid flows through the valve without restriction and a position at which hydraulic fluid is blocked from flowing through the valve, the valve responding to the application of pressurized fluid from the source, which is greater than pressure applied to the motor to cause rotation of the motor, to the hydraulic line to which the control line is coupled by moving from the position at which fluid is not restricted to the position at which fluid flow is blocked. A second pair of hydraulic lines are provided which are respectively coupled to different ones of the first pair of hydraulic lines and to the brake.

In a first embodiment of the invention, a hydraulic line is provided which couples the second pair of hydraulic lines to one of the first hydraulic lines and wherein the valve has a passage which is closed to the flow of hydraulic fluid from the second pair of hydraulic lines to one of the first pair of hydraulic lines when the valve permits unrestricted flow of hydraulic fluid through the first pair of hydraulic lines and progressively opens to permit the flow of hydraulic fluid when the valve moves to a position closing the flow of hydraulic fluid through the first pair of hydraulic lines.

Furthermore, the first embodiment of the invention includes a hydraulic fluid return line, coupled to the brake, the hydraulically powered motor and one of the first pair of hydraulic lines, for returning hydraulic fluid from the brake and motor to the one of the first pair of hydraulic lines; the hydraulic line coupling the second pair of hydraulic lines to the one of the first hydraulic lines having a flow capacity which delays a drop in hydraulic pressure in the second pair of hydraulic lines when the valve is moved to the position to shut-off fluid flow in the first pair of hydraulic lines to maintain preload for a predetermined time interval; and the control line has flow capacity which delays application of hydraulic pressure sufficient to cause the valve to move to the position to block flow of hydraulic fluid for a predetermined time interval after hydraulic pressure in the one of the first pair of hydraulic lines has reached a level which would cause the valve to move to the position to block fluid flow. A pair of check valves are provided which are respectively disposed in each of the lines of the second pair of hydraulic lines for preventing backflow of hydraulic fluid from the brake to the first pair of hydraulic lines.

The second embodiment of the present invention includes a shunt hydraulic line coupling the lines of the second pair of hydraulic lines together; a hydraulic fluid return line, coupled to the brake, the hydraulically powered motor and one of the first pair of hydraulic lines, for returning hydraulic fluid from the brake and motor to one of the first pair of hydraulic lines; a pair of check valves respectively disposed in each of the lines of the second pair of hydraulic lines for preventing backflow of hydraulic fluid from the brake to the first pair of hydraulic lines. The shunt hydraulic line has a flow capacity that permits sufficient hydraulic pressure to build up in one of the second pair of hydraulic lines when the valve permits hydraulic fluid flow in the first pair of hydraulic lines to cause the brake to be released and permits the brake to engage if the motor is turned off while the valve is in the position to block fluid flow in the first pair of hydraulic lines.

BEST MODE FOR CARRYING OUT THE INVENTION

Figure 2:
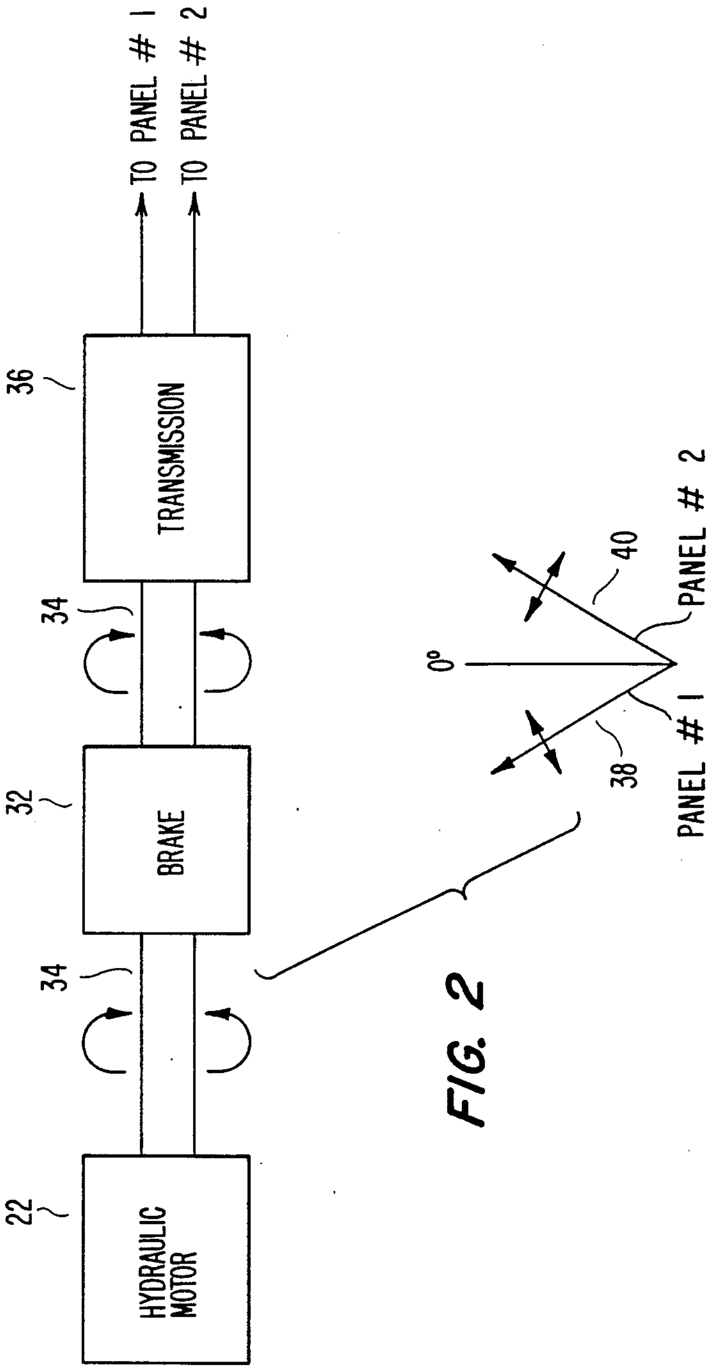
FIG. 2 is a block diagram of a present invention without the fluid control system.
Figure 3:
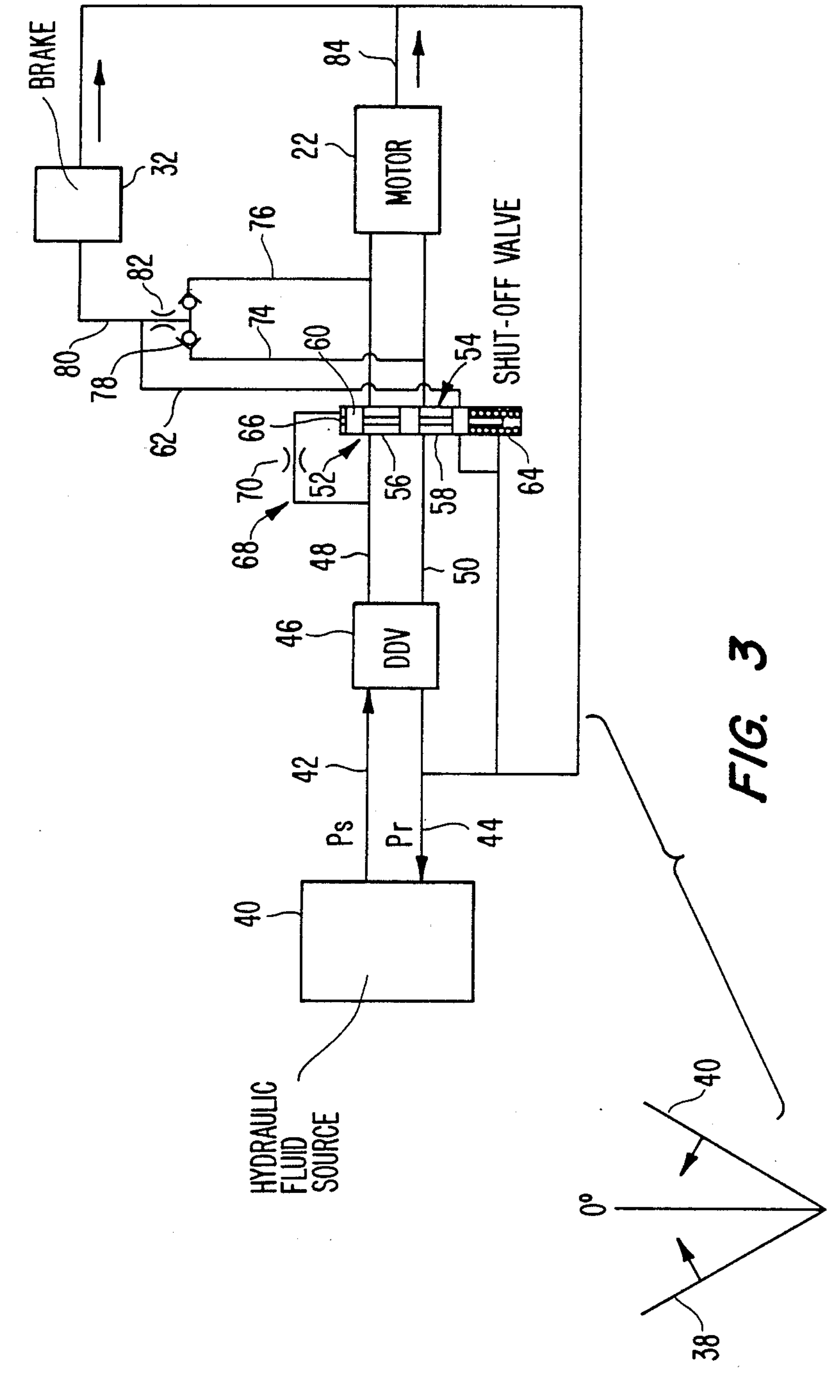
FIG. 3 illustrates a first embodiment of the present invention prior to the establishment of preload.

FIG. 2 illustrates a block diagram of the present invention without the hydraulic fluid controller. A hydraulic motor 22 is mechanically coupled to a brake 32 by means of a drive shaft or other torque transmitting device 34. The hydraulic motor 22 is reversible by changing the hydraulic line of the hydraulic motor to which high pressure hydraulic fluid is applied. The brake 32 may be any conventionally powered hydraulic brake for applying sufficient braking force to the drive shaft 34 to maintain one or more members 38 and 40 under a preload. The brake has a release pressure which is less than the hydraulic pressure applied to the motor 22 during rotation such as illustrated in FIG. 3. The magnitude of the preload is determined by the motor stall torque. The drive shaft 34 is coupled to a transmission which may be any suitable transmission for applying power for moving a first panel 38 and a second panel 40 in reversible directions as indicated by the bidirectional arrows associated with the panels 38 and 40. When the preload condition is established by activation of the brake 32 and deactivation of the hydraulic motor 34, the panels 36 and 38 are respectively disposed at the zero degree position which is top dead center in the diagram and applying force to each other. By utilization of the brake 32 to maintain the preload, the deficiencies of the prior art regarding heating of hydraulic fluid and leakage and quickness of response in moving the preloaded panels to a non-preloaded condition is overcome.

FIG. 3 illustrates a block diagram of the present invention prior to the establishment of preload in which the transmission 36 is omitted. A source of pressurized hydraulic fluid 40 provides high pressure hydraulic fluid on line 42 and receives low pressure hydraulic fluid on hydraulic line 44 returned from the motor 22 as described below. A conventional DDV valve 46 is coupled to the hydraulic lines 42 and 44 for permitting selective outputting of high pressure hydraulic fluid on hydraulic lines 48 or 50. When high pressure hydraulic fluid is outputted on line 48, hydraulic motor 22 will move in a first direction and when high pressure hydraulic fluid is outputted on line 50 the motor will move in the opposite direction. It should also be understood that alternatively EHSV valve may be used in place of the DDV valve 46.

Figure 1:
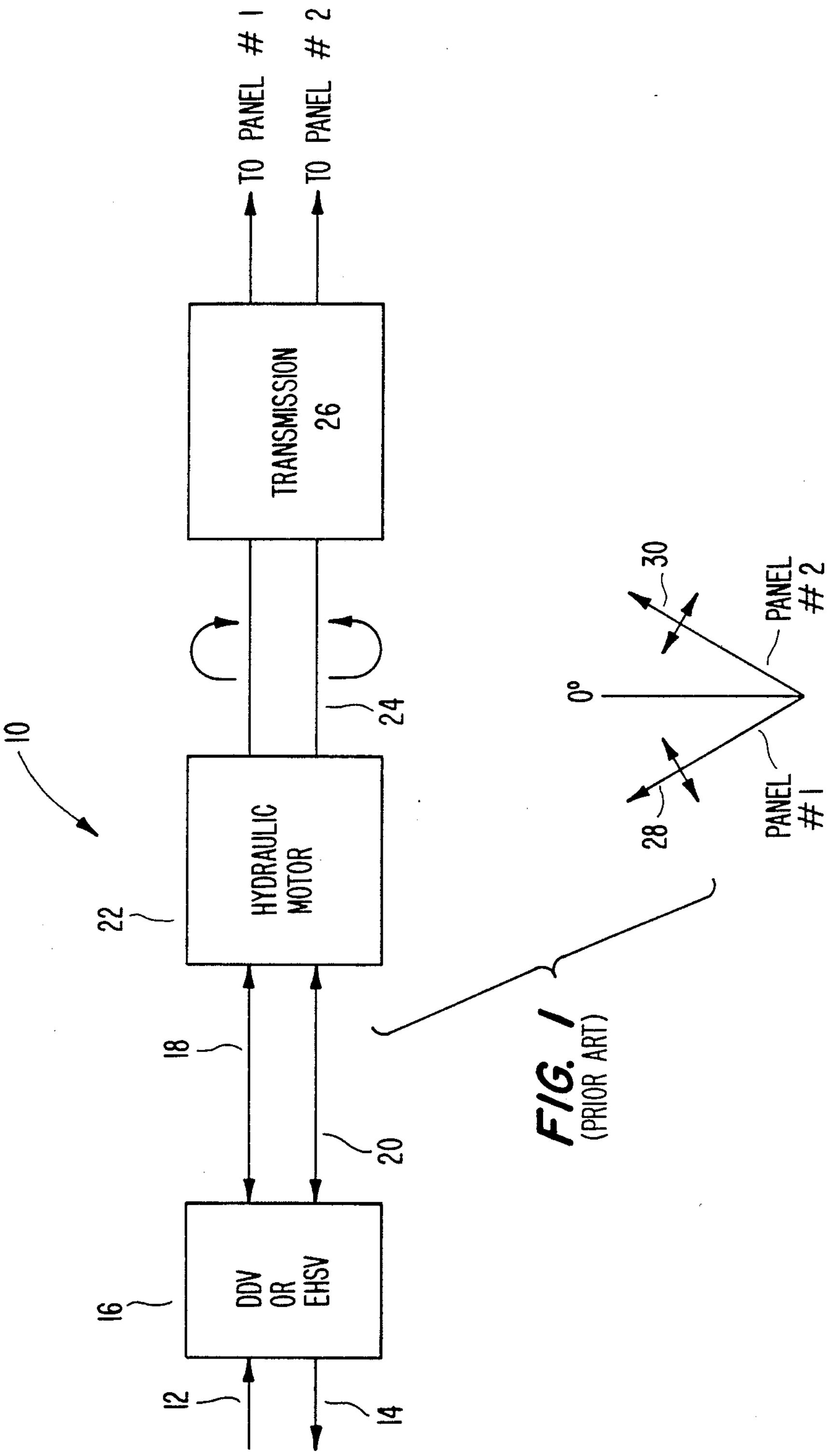
FIG. 1 (PRIOR ART)
FIG. 1 is a diagram of the prior art.
Figure 4:
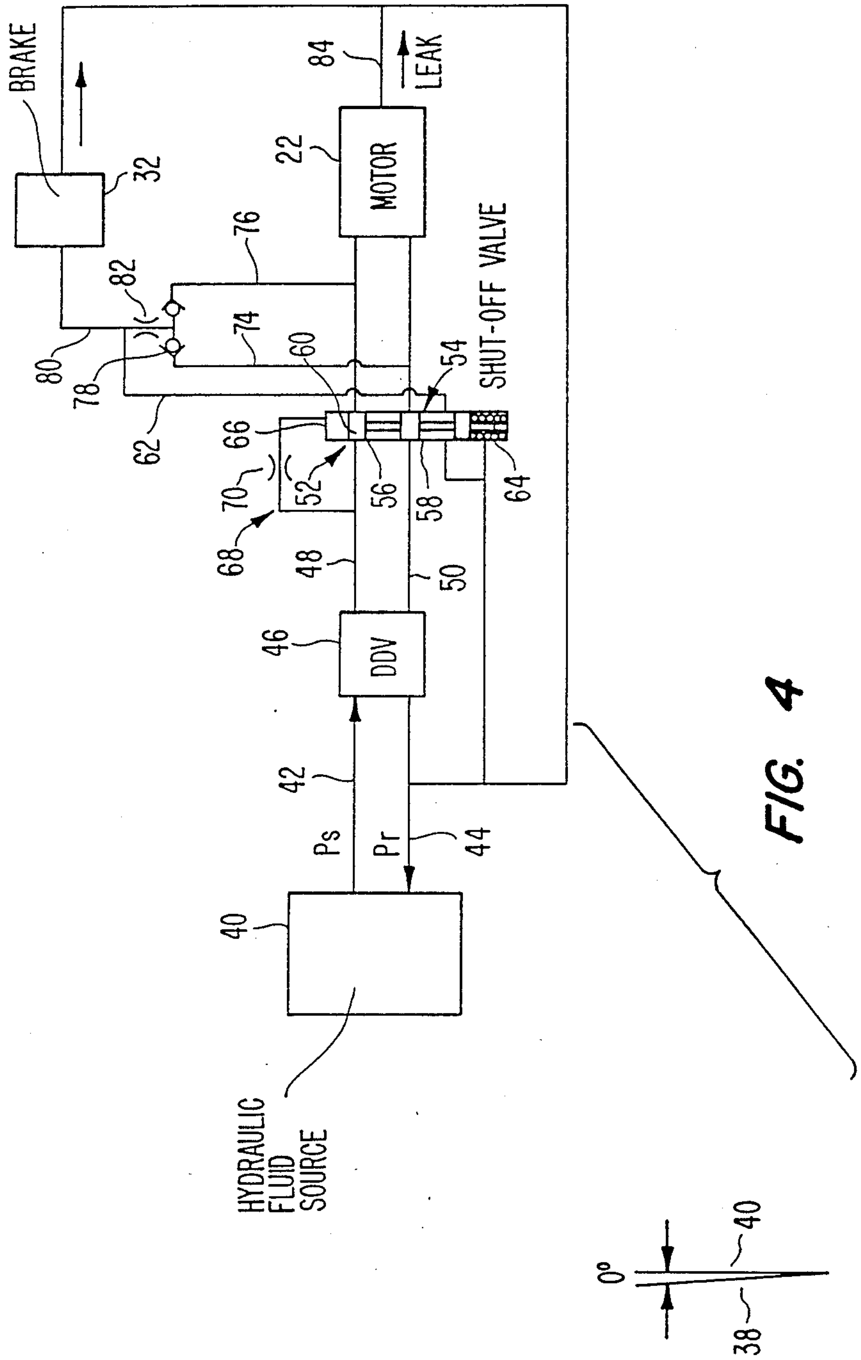
FIG. 4 illustrates the first embodiment of the present invention at the time of establishing preload.

The invention utilizes a shut-off valve 52 for controlling the sequencing of operation of the motor 22 and the brake 32 as described below. The shut-off valve has a movable cylindrical member 54 which has a pair of passages 56 and 58 which permit hydraulic fluid flow through the valve. As illustrated in FIG. 3 the passages 56 and 58 respectively permit hydraulic fluid to flow in the hydraulic lines 48 and 50. The hydraulic valve also has a plurality of cylindrical sections 60 which in a first position as illustrated in FIG. 3 do not restrict hydraulic fluid flow in the lines 48 and 50 but which block hydraulic fluid flow in hydraulic line 62. In the second position as illustrated in FIG. 4, the cylindrical sections 60 block fluid flow in the hydraulic lines 48 and 50 but allow hydraulic fluid flow in the hydraulic line 62. A spring 64 biases the valve in the first position as illustrated in FIG. 1 in the absence of high pressure hydraulic fluid being applied to line 68 higher than the threshold of valve 52 necessary to cause movement to shut off fluid flow in lines 48 and 50. The threshold pressure is greater than the pressure applied to the motor 22 during rotation of the motors 22 so that during normal operation of the motor the valve 52 assumes the position of FIG. 3. High pressure hydraulic fluid on hydraulic line 48 causes high pressure hydraulic fluid to be applied to chamber 66 of the shut-off valve 52 by means of hydraulic line 68 which is coupled to hydraulic line 48. A restriction orifice 70 establishes a flow capacity in the control line 68 to delay the application of high pressure hydraulic fluid to the top chamber 66 of the valve 54 for a period of time sufficient to allow the motor to run. The size of the restriction 70 is chosen to provide sufficient time delay to permit the motor to apply the preloading force and will vary depending upon the magnitude of the preload to be applied to the panels. It should also be understood that the cross-sectional area of the line may be chosen to provide the requisite flow capacity thus eliminating the requirement for a discrete in line restrictor 70. A pair hydraulic lines 74 and 76 couple the hydraulic lines 48 and 50 to brake 32. A pair of check valves 78 are respectively disposed in the hydraulic lines 74 and 76 to prevent backflow of pressurized hydraulic fluid from the brake to the hydraulic lines 48 and 50. Hydraulic line 80 couples the pair of hydraulic lines 74 and 76 to the brake 32. The purpose of the hydraulic line 62 is to decouple the brake engagement pressure threshold from the pressure in hydraulic lines 48 and 50.

The brake 32 is pressure responsive and is deactivated to release the panels 38 and 40 when pressure on the line 80 rises above a predetermined pressure threshold. The pressure threshold for releasing the brake 32 is chosen to be a pressure less than the pressure which is present during running of the motor 12 when the panels are not preloaded.

As discussed above, the hydraulic motor 22 has a characteristic that high pressure hydraulic fluid applied from hydraulic line 48 or 50 causes leakage on return line 84 which returns low pressure hydraulic fluid from the motor 22 and brake 32 to hydraulic line 44. The amount of hydraulic fluid leakage from the motor 22 during the application of high pressure hydraulic fluid thereto is unacceptably high for applications of maintaining the panels 38 and 40 under a preload condition as a consequence of stalling power being applied continually to the motor 22. The restriction 82 delays the loss of motor torque to a point when the brake 32 may hold the panels 38 and 40 under preload. Without restriction 82, motor torque would be lost prior to brake engagement.

Upon start-up the application of maximum pressure from the hydraulic fluid source is applied to the motor 22 to start rotation. Restriction 70 prevents the valve 52 from instantaneously changing position by preventing high pressure from building up in chamber 66. As the motor rotates the operating pressure on the hydraulic line 48 drops from the maximum pressure provided by the source of hydraulic fluid 40 to a level below the threshold pressure necessary in line 68 to cause the valve 52 to close to block the flow of hydraulic fluid to the brake 32. Thus, valve 52 maintains the position as shown in FIG. 3 until the threshold pressure of the valve is reached.

FIG. 4 illustrates the operation of the present invention at the time of establishing preload. Identical reference numerals identify like parts in FIGS. 3 and 4. As has been explained above, the valve 52 is pressure responsive to the hydraulic pressure on line 68 and moves to the position as illustrated in FIG. 4 after the elapsing of a predetermined time delay caused by the restriction 70 in response to the hydraulic pressure on line 48 rising above the normal pressure to the pressure threshold of valve 52 occurring during motor rotation which occurs in response to the panels 38 and 40 contacting each other. The predetermined time delay caused by restriction 70 permits the preload condition to be established on the panels 38 and 40 prior to movement of the valve cylindrical section 54 to the position as illustrated which cuts off high pressure hydraulic fluid from being applied to the hydraulic motor 22 to disable the motor. When the valve moves to the position as illustrated in FIG. 4, the pressure on hydraulic line 62 and 80 drops to a pressure which causes the brake 32 to lock the panels 38 and 40 in preload. The restriction 82 maintains high pressure in the motor 22 for a period of time after the pressure on lines 62 and 80 drops to a point there brake 32 is engaged which ensures maintaining preload. Thereafter the valve 52 continues to move to completely shut off the motor 22 as a consequence of high pressure hydraulic fluid being disconnected therefrom. The disconnection of high pressure hydraulic fluid from the motor 22 reduces the amount of leakage hydraulic fluid from the motor and further eliminates heating of the hydraulic fluid present in the prior art in which preload was established by stalling of the hydraulic motor 22 by continued application of high pressure hydraulic fluid to the motor.

Figure 5:
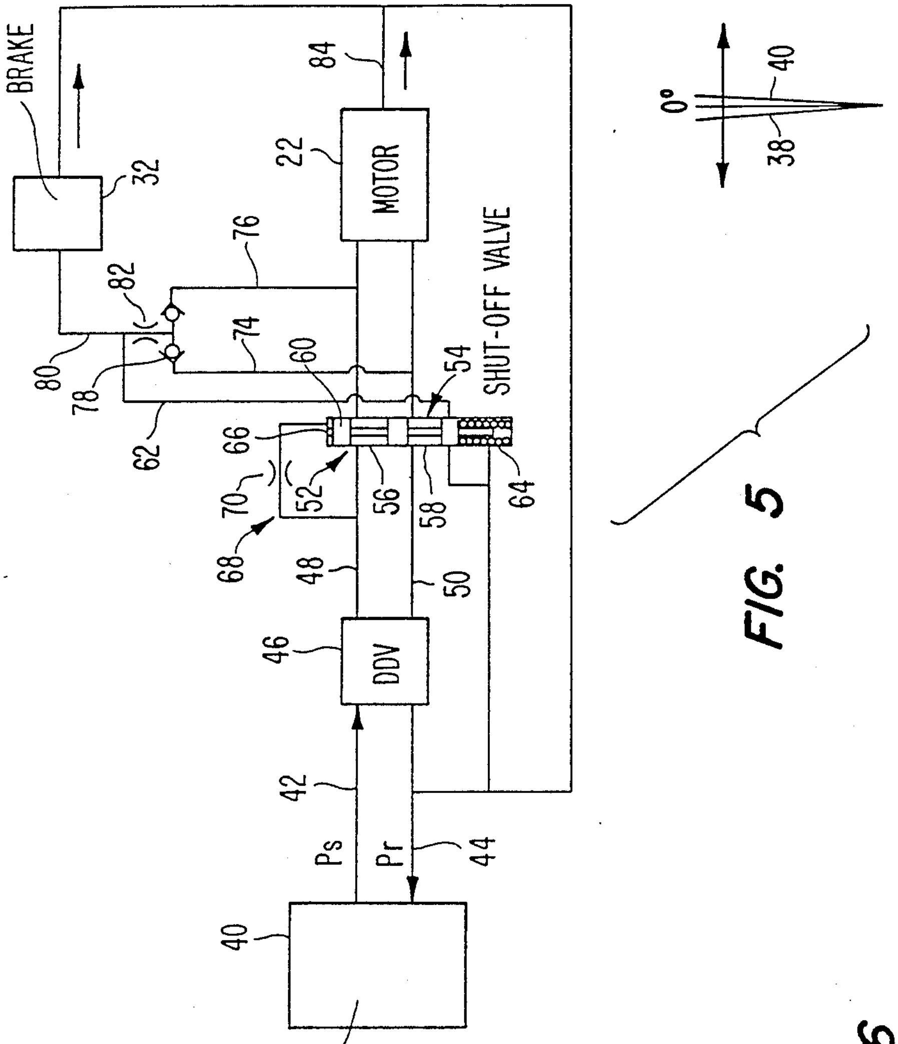
FIG. 5 illustrates the first embodiment of the present invention at the time of removing preload.

FIG. 5 illustrates the present invention at the time of removal of the preload from the panels 38 and 40. Like parts are identified by like parts in FIGS. 3–5. One of the advantages of the present invention is that a quick response is available in moving the panels 38 and 40 from the preload condition than that which would be achieved by merely adding a brake with an external control pressure. In response to the DDV 46 reversing the pressure on hydraulic lines 48 and 50 to apply high pressure to line 50 and low pressure to line 48, valve 54 moves to the first position as illustrated which causes the line 62 to be blocked and high pressure to be applied to line 74. Application of high pressure to line 74 causes the brake to release as soon as the hydraulic pressure in line rises above threshold pressure after a time interval determined by the flow capacity of the restriction 82. Thereafter, the panels 38 and 40 move apart. Accordingly the panels 38 and 40 separate with the valve 52 maintaining the position as illustrated in FIG. 5.

Figure 6:
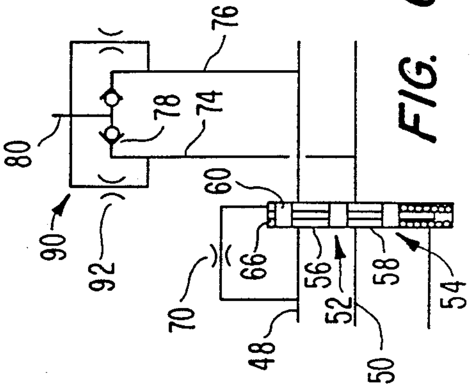
FIG. 6 illustrates a fragmentary view of a second embodiment of the present invention.

FIG. 6 illustrates a fragmentary view of an alternative embodiment of the present invention. Like reference numerals in FIGS. 3–6 identify like parts. FIG. 6 differs from the embodiment illustrated in FIGS. 3–5 in that the valve 52 is not ported by means of hydraulic line 62 to the brake line 80. Furthermore, hydraulic lines 74 and 76 are shunted by shunt hydraulic line 90 which contains a pair of restrictions 92. The operation of the second embodiment is similar to the first embodiment with the exception that control of the brake 80 by means of hydraulic line 80 is directly controlled by the hydraulic pressures on hydraulic lines 48 and 50. Thus, the pressure of hydraulic fluid applied to the motor 22 (not illustrated) directly influences the control of the brake 32 instead of in the first embodiment wherein the hydraulic pressure of the line 44 controlled the brake 32. The shunt line 90 functions to relieve hydraulic pressure across the check valves 78 to permit the brake 32 to engage. The restrictions 92 have a flow capacity which permits hydraulic pressure to build up in the hydraulic line 80 in response to high pressure on either hydraulic lines 48 and 50 to a level to permit the brake 32 (not illustrated) to release. The timed sequence of operation of the motor 22 and brake 32 is identical to the sequence described above with regard to FIGS. 3–5.

While the invention has been described in terms of its preferred embodiment, it should be understood that numerous modifications may be made thereto without departing from the spirit and scope of the appended claims. It should be understood that while the embodiment as illustrated describes the preloading of two contacting flight panels 38 and 40 of an aircraft, other preload conditions could be utilized such as a movable panel impacting a fixed stop. Furthermore, it should be understood that the invention is not limited to the specifics of the motor 22, brake 32, DDV or EHSV 46 or shut-off valve 52 with other implementations of these devices being usable in practicing of the invention. Finally, the restrictions in the various hydraulic lines may be implemented by using hydraulic lines of reduced cross sectional area instead of by providing discrete restrictions. .

I claim:

1. A hydraulically powered drive unit for moving member into and away from a position at which the a member is under a preload comprising:

(a) a hydraulically powered motor coupled to the movable member, for moving the movable member to and from the position at which the member is preloaded;

(b) a source of pressurized hydraulic fluid coupled to the hydraulic motor for supplying power to the motor for moving the member;

(c) a brake, coupled to the movable member, for holding the movable member in the position at which the member is preloaded; and (d) hydraulic control means, coupled to the motor, the brake, and the source of pressurized hydraulic fluid which is responsive to pressure variations originating within the drive unit, to actuate the brake after the motor has moved the member to the position at which the member is preloaded and deactivates the motor while maintaining the member under preload.

2. A hydraulically powered drive unit in accordance with claim 1, wherein when the motor moves the member from the position at which the member is preloaded the hydraulic fluid control means releases the brake and thereafter actuates the motor.

3. A hydraulically powered drive unit in accordance with claim 1, wherein the brake is hydraulically controlled and the control means activates the brake by changing pressure of hydraulic fluid applied thereto and deactivates the motor by reducing the pressure of hydraulic fluid applied thereto after the brake has been activated.

4. A hydraulically powered drive unit in accordance with claim 2, wherein in moving the member from the position in which the member is preloaded the control means deactivates the brake by changing pressure of hydraulic fluid applied thereto and activates the motor by increasing the pressure of hydraulic fluid applied thereto.

5. A hydraulically powered drive unit in accordance with claim 1, wherein the fluid control means comprises:

(a) a first pair of hydraulic lines disposed between the source of hydraulic fluid and the hydraulically powered motor;

(b) a valve, disposed in the hydraulic lines, having a control line coupled to one of the hydraulic lines, which moves between a position that hydraulic fluid flows through the valve without restriction and a position at which hydraulic fluid is blocked from flowing through the valve, the valve only moving, from the position at which fluid is not restricted to the position at which fluid is blocked in response to the application of pressurized hydraulic fluid from the source, which is greater than pressure applied to the motor to cause rotation of the motor, to the hydraulic line to which the control line is coupled.

6. A hydraulically powered drive unit in accordance with claim 2, wherein the fluid control means comprises:

(a) a first pair of hydraulic lines disposed between the source of hydraulic fluid and the hydraulically powered motor;

(b) a valve, disposed in the hydraulic lines, having a control line coupled to one of the hydraulic lines, which moves between a position that hydraulic fluid flows through the valve without restriction and a position at which hydraulic fluid is blocked from flowing through the valve, the valve only moving, from the position at which fluid is not restricted to the position at which fluid is blocked in response to the application of pressurized hydraulic fluid from the source, which is greater than pressure applied to the motor to cause rotation of the motor, to the hydraulic line to which the control line is coupled.

7. A hydraulically powered drive unit in accordance with claim 3, wherein the fluid control means comprises:

(a) a first pair of hydraulic lines disposed between the source of hydraulic fluid and the hydraulically powered motor;

(b) a valve, disposed in the hydraulic lines, having a control line coupled to one of the hydraulic lines, which moves between a position that hydraulic fluid flows through the valve without restriction and a position at which hydraulic fluid is blocked from flowing through the valve, the valve only moving, from the position at which fluid is not restricted to the position at which fluid is blocked in response to the application of pressurized hydraulic fluid from the source, which is greater than pressure applied to the motor to cause rotation of the motor, to the hydraulic line to which the control line is coupled.

8. A hydraulically powered drive unit in accordance with claim 4, wherein the fluid control means comprises:

(a) a first pair of hydraulic lines disposed between the source of hydraulic fluid and the hydraulically powered motor;

(b) a valve, disposed in the hydraulic lines, having a control line coupled to one of the hydraulic lines, which moves between a position that hydraulic fluid flows through the valve without restriction and a position at which hydraulic fluid is blocked from flowing through the valve, the valve only moving, from the position at which fluid is not restricted to the position at which fluid is blocked in response to the application of pressurized hydraulic fluid from the source, which is greater than pressure applied to the motor to cause rotation of the motor, to the hydraulic line to which the control line is coupled.

9. A hydraulically powered drive unit in accordance with claim 5, further comprising:

a second pair of hydraulic lines respectively coupled to different ones of the first pair of hydraulic lines and to the brake.

10. A hydraulically powered drive unit in accordance with claim 6, further comprising:

a second pair of hydraulic lines respectively coupled to different ones of the first pair of hydraulic lines and to the brake.

11. A hydraulically powered drive unit in accordance with claim 7, further comprising:
a second pair of hydraulic lines respectively coupled to different ones of the first pair of hydraulic lines and to the brake.

12. A hydraulically powered drive unit powered system in accordance with claim 8, further comprising:
a second pair of hydraulic lines respectively coupled to different ones of the first pair of hydraulic lines and to the brake.

13. A hydraulically powered drive unit in accordance with claim 9 further comprising:
(a) a hydraulic line coupling the second pair of hydraulic lines to one of the first hydraulic lines and wherein;
(b) the valve has a passage which is closed to the flow of hydraulic fluid from the second pair of hydraulic lines to the one of the first pair of hydraulic lines when the valve permits unrestricted flow of hydraulic fluid through the first pair of fluid lines and progressively opens to permit the flow of hydraulic fluid when the valve moves to a position closing the flow of hydraulic fluid through the first pair of hydraulic lines.

14. A hydraulically powered drive unit in accordance with claim 10 further comprising:
(a) a hydraulic line coupling the second pair of hydraulic lines to one of the first hydraulic lines and wherein;
(b) the valve has a passage which is closed to the flow of hydraulic fluid from the second pair of hydraulic lines to the one of the first pair of hydraulic lines when the valve permits unrestricted flow of hydraulic fluid through the first pair of fluid lines and progressively opens to permit the flow of hydraulic fluid when the valve moves to a position closing the flow of hydraulic fluid through the first pair of hydraulic lines.

15. A hydraulically powered drive unit in accordance with claim 11, further comprising:
(a) a hydraulic line coupling the second pair of hydraulic lines to one of the first hydraulic lines and wherein;
(b) the valve has a passage which is closed to the flow of hydraulic fluid from the second pair of hydraulic lines to the one of the first pair of hydraulic lines when the valve permits unrestricted flow of hydraulic fluid through the first pair of fluid lines and progressively opens to permit the flow of hydraulic fluid when the valve moves to a position closing the flow of hydraulic fluid through the first pair of hydraulic lines.

16. A hydraulically powered drive unit in accordance with claim 12, further comprising:
(a) a hydraulic line coupling the second pair of hydraulic lines to one of the first hydraulic lines and wherein;
(b) the valve has a passage which is open to the flow of hydraulic fluid from the second pair of hydraulic lines to the one of the first pair of hydraulic lines when the valve permits hydraulic fluid to flow through the first pair of fluid lines and progressively closes to restrict the flow of hydraulic fluid when the valve moves to a position closing the flow of hydraulic fluid through the first pair of hydraulic lines.

17. A hydraulically powered drive unit in accordance with claim 13, further comprising:
(a) a hydraulic fluid return line, coupled to the brake, the hydraulically powered motor and one of the first pair of hydraulic lines, for returning hydraulic fluid from the brake and the motor to the one of the first pair of hydraulic lines; and wherein;
(b) the hydraulic line coupling the second pair of hydraulic lines to the one of the first hydraulic lines has a flow capacity which delays a drop in hydraulic pressure in the second pair of hydraulic lines when the valve is moved to the position to shut-off fluid flow in the first pair of hydraulic lines to maintain preload for a predetermined time interval to permit the brake to lock the member in preload; and
(c) the control line has a flow capacity which delays application of hydraulic pressure sufficient to cause the valve to move to the position to block flow of hydraulic fluid for a predetermined time interval after hydraulic pressure in the one of the first pair of hydraulic lines has reached a level which would cause the valve to move to the position to block fluid flow.

18. A hydraulically powered drive unit in accordance with claim 14, further comprising:
(a) a hydraulic fluid return line, coupled to the brake, the hydraulically powered motor and one of the first pair of hydraulic lines, for returning hydraulic fluid from the brake and the motor to the one of the first pair of hydraulic lines; and wherein
(b) the hydraulic line coupling the second pair of hydraulic lines to the one of the first hydraulic lines has a flow capacity which delays a drop in hydraulic pressure in the second pair of hydraulic lines when the valve is moved to the position to shut-off fluid flow in the first pair of hydraulic lines to maintain preload for a predetermined time interval; and
(c) the control line has a flow capacity which delays application of hydraulic pressure sufficient to cause the valve to move to the position to block flow of hydraulic fluid for a predetermined time interval after hydraulic pressure in the one of the first pair of hydraulic lines has reached a level which would cause the valve to move to the position to block fluid flow.

19. A hydraulically powered drive unit in accordance with claim 15, further comprising:
(a) a hydraulic fluid return line, coupled to the brake, the hydraulically powered motor and one of the first pair of hydraulic lines, for returning hydraulic fluid from the brake and the motor to the one of the first pair of hydraulic lines;
(b) the hydraulic line coupling the second pair of hydraulic lines to the one of the first hydraulic lines has a flow capacity which delays a drop in hydraulic pressure in the second pair of hydraulic lines when the valve is moved to the position to shut-off fluid flow in the first pair of hydraulic lines to maintain preload for a predetermined time interval; and
(c) the control line has a flow capacity which delays application of hydraulic pressure sufficient to cause the valve to move to the position to block flow of hydraulic fluid for a predetermined time interval after hydraulic pressure in the one of the first pair of hydraulic lines has reached a level which would cause the valve to move to the position to block fluid flow.

20. A hydraulically powered drive unit in accordance with claim 16 further comprising:

(a) a hydraulic fluid return line, coupled to the brake, the hydraulically powered motor and one of the first pair of hydraulic lines, for returning hydraulic fluid from the brake and the motor to the one of the first pair of hydraulic lines;

(b) the hydraulic line coupling the second pair of hydraulic lines to the one of the first hydraulic lines has a flow capacity which delays a drop in hydraulic pressure in the second pair of hydraulic lines when the valve is moved to the position to shut-off fluid flow in the first pair of hydraulic lines to maintain preload for a predetermined time interval; and (c) in the control line has a flow capacity which delays application of hydraulic pressure sufficient to cause the valve to move to the position to block flow of hydraulic fluid for a predetermined time interval after hydraulic pressure in the one of the first pair of hydraulic lines has reached a level which would cause the valve to move to the position to block fluid flow.

21. A hydraulically powered drive unit in accordance with claim 9, further comprising:

(a) a pair of check valves respectively disposed in each of the lines of the second pair of hydraulic lines for preventing backflow of hydraulic fluid from the brake to the first pair of hydraulic lines;

(b) a shunt hydraulic line coupling the lines of the second pair of hydraulic lines together to allow hydraulic pressure to dissipate across the check valves to permit the brake to engage; and (c) a hydraulic fluid return line, coupled to the brake, the hydraulically powered motor and one of the first pair of hydraulic lines for returning hydraulic fluid from the brake and the motor to the one of the first pair of hydraulic lines.

22. A hydraulically powered drive unit in accordance with claim 10, further comprising:

(a) a shunt hydraulic line coupling the lines of the second pair of hydraulic lines together;

(b) a pair of check valves respectively disposed in each of the lines of the second pair of hydraulic lines for preventing backflow of hydraulic fluid from the brake to the first pair of hydraulic lines; and (c) a hydraulic fluid return line, coupled to the brake, the hydraulically powered motor and one of the first pair of hydraulic lines for returning hydraulic fluid from the brake and the motor to the one of the first pair of hydraulic lines.

23. A hydraulically powered drive unit in accordance with claim 11, further comprising:

(a) a shunt hydraulic line coupling the lines of the second pair of hydraulic lines together;

(b) a pair of check valves respectively disposed in each of the lines of the second pair of hydraulic lines for preventing backflow of hydraulic fluid from the brake to the first pair of hydraulic lines; and (c) a hydraulic fluid return line, coupled to the brake, the hydraulically powered motor and one of the first pair of hydraulic lines for returning hydraulic fluid from the brake and the motor to the one of the first pair of hydraulic lines.

24. A hydraulically powered drive unit in accordance with claim 12, further comprising:

(a) a shunt hydraulic line coupling the lines of the second pair of hydraulic lines together;

(b) a pair of check valves respectively disposed in each of the lines of the second pair of hydraulic lines for preventing backflow of hydraulic fluid from the brake to the first pair of hydraulic lines; and (c) a hydraulic fluid return line, coupled to the brake, the hydraulically powered motor and one of the first pair of hydraulic lines for returning hydraulic fluid from the brake and the motor to the one of the first pair of hydraulic lines.

25. A hydraulically powered drive unit in accordance with claim 17, further comprising:

a pair of check valves respectively disposed in each of the lines of the second pair of hydraulic lines for preventing backflow of hydraulic fluid from the brake to the first pair of hydraulic lines.

26. A hydraulically powered drive unit in accordance with claim 18, further comprising:

a pair of check valves respectively disposed in each of the lines of the second pair of hydraulic lines for preventing backflow of hydraulic fluid from the brake to the first pair of hydraulic lines.

27. A hydraulically powered drive unit in accordance with claim 19, further comprising:

a pair of check valves respectively disposed in each of the lines of the second pair of hydraulic lines for preventing backflow of hydraulic fluid from the brake to the first pair of hydraulic lines.

28. A hydraulically powered drive unit in accordance with claim 20, further comprising:

a pair of check valves respectively disposed in each of the lines of the second pair of hydraulic lines for preventing backflow of hydraulic fluid from the brake to the first pair of hydraulic lines.

29. A hydraulically powered drive unit in accordance with claim 1 wherein:

preload is established by applying a force to the member which is stopped by another member.

30. A hydraulically powered drive unit in accordance with claim 29, wherein:

the members are control surfaces of an aircraft.

31. A hydraulically powered drive unit in accordance with claim 17 wherein:

the flow capacity of the control line and the hydraulic line coupling the second pair of hydraulic lines to the one of the pair of first hydraulic lines is provided by a restriction disposed in each of the control line and the hydraulic line coupling the second pair of hydraulic lines to the one of the first lines.

32. A hydraulically powered drive unit in accordance with claim 21 wherein:

when the valve is open the shunt line has a flow capacity which permits the pressure in the one of the second pair of control lines to build up to a point to cause the brake to disengage.

33. A hydraulically powered drive unit in accordance with claim 32 wherein:

the flow capacity of the shunt line is established by one or more restrictions disposed therein.

34. A hydraulically powered drive unit in accordance with claim 21 wherein:

the shunt hydraulic line has a flow capacity that permits sufficient hydraulic pressure to build up in the second pair of hydraulic lines when the valve permits hydraulic fluid flow in the first pair of hydraulic lines to cause the brake to be released and permit the brake to engage if the motor is turned off while the valve is in the position to prevent fluid flow in the first pair of hydraulic lines.

35. A hydraulically powered drive unit for moving a member into and away from a position at which the member is under a preload comprising:

(a) a hydraulically powered motor coupled to the member, for moving the member to and from the position at which the member is preloaded;

(b) a source of pressurized hydraulic fluid coupled to the hydraulic motor for supplying power to the motor for moving the movable member;

(c) a brake coupled to the movable member for holding the member in the position at which the member is preloaded; and (d) hydraulic fluid control means, coupled to the motor, the brake and the source of pressurized hydraulic fluid which activates the brake in response to a hydraulic pressure greater than the pressure applied to the motor to cause the motor to rotate after the motor has moved the member to the position at which the member is preloaded and deactivates the motor while maintaining the member under preload.

* * * * *